US012783961B2

(12) United States Patent
Huang et al.

(10) Patent No.: US 12,783,961 B2
(45) Date of Patent: Nov. 3, 2026

(54) SYSTEMS AND METHODS FOR FAIRNESS-ENHANCED UTILITY-PRESERVING DATA TRANSFORMATION FOR ATTRIBUTE SUPPRESSION

(71) Applicant: JPMORGAN CHASE BANK, N.A., New York, NY (US)

(72) Inventors: Wei-Cheng Huang, New York, NY (US); Richard Chen, Baldwin Place, NY (US); Hsiang Hsu, Boston, MA (US); Shaohan Hu, Yorktown Heights, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 78 days.

(21) Appl. No.: 19/042,588

(22) Filed: Jan. 31, 2025

(65) Prior Publication Data

US 2026/0228604 A1 Aug. 6, 2026

(51) Int. Cl.
*G06N 20/00* (2019.01)
*G06F 21/62* (2013.01)

(52) U.S. Cl.
CPC ......... *G06N 20/00* (2019.01); *G06F 21/6254* (2013.01)

(58) Field of Classification Search
CPC ............................ G06N 20/00; G06F 21/6254
See application file for complete search history.

(56) References Cited

U.S. PATENT DOCUMENTS

2020/0143079 A1* 5/2020 Sohn .................. G06F 21/6245
2021/0150269 A1* 5/2021 Choudhury ........ G06V 30/1985
2021/0287119 A1* 9/2021 Rink .................. G06Q 30/0201
2021/0342546 A1* 11/2021 Beigi ..................... G06N 3/044
2022/0222539 A1* 7/2022 Klein ................... G06N 3/0475
2025/0181920 A1* 6/2025 Tahir ........................ G06N 7/01

OTHER PUBLICATIONS

David Madras, Elliot Creager, Toniann Pitassi, Richard Zemel, Learning Adversarially Fair and Transferable Representations, 2018 (Year: 2018).*

Christina Wadsworth, Francesca Vera, Chris Piech, Achieving Fairness through Adversarial Learning: an Application to Recidivism Prediction, 2018 (Year: 2018).*

* cited by examiner

*Primary Examiner* — Blake I Narramore
(74) *Attorney, Agent, or Firm* — GREENBERG TRAURIG LLP

(57) ABSTRACT

A method may include: receiving an original dataset comprising samples having a plurality of attributes; receiving an identification of a utility attribute, a sensitive attribute, and a fairness attribute from the plurality of attributes; computing entropy statistics for the original dataset using the utility attribute, the sensitive attribute, and the fairness attribute; training auxiliary classifier models using the utility attribute, the sensitive attribute, and/or the fairness attribute; training an auxiliary feature extractor model using attributes other than the utility attribute; training a transformation model with the auxiliary classifier models and the auxiliary feature extractor model; transforming the original dataset into a transformed dataset using the transformation model; and training a machine learning model using the transformed dataset, wherein the trained machine learning model maintains information associated with the utility attribute, maintains fairness with respect to the fairness attribute, and does not leak information about the sensitive attribute.

20 Claims, 3 Drawing Sheets

SYSTEMS AND METHODS FOR FAIRNESS-ENHANCED UTILITY-PRESERVING DATA TRANSFORMATION FOR ATTRIBUTE SUPPRESSION

BACKGROUND

1. Field of the Invention

Embodiments relate generally to systems and methods for fairness-enhanced utility-preserving data transformation for attribute suppression.

2. Description of the Related Art

Rapid advances in the fields of artificial intelligence and machine learning (AI/ML) are highly attributable to the growing richness of the datasets used in these fields. For example, studies have shown that models (e.g., machine learning models) trained on larger datasets offer better generalization and are more effectively applied to downstream applications. There are, however, ethical concerns with respect to individual privacy and personal data when using large datasets in AI/ML operations. Many, if not most, large datasets contain such sensitive data as personally identifiable information, medical information, financial information, etc. Moreover, such sensitive data and the sharing thereof may be regulated at an organizational and/or governmental level.

Empirical operations may be performed on a dataset that may show sensitive data has been effectively obfuscated (e.g., that a classifier model cannot detect sensitive data). Empirical evidence, however, does not provide a theoretical guarantee or proof that sensitive data has been effectively obfuscated. A theoretical proof may be beneficial or even required in circumstances, such as a regulatory environment, before a dataset containing sensitive data can be used in a public or shared environment. Accordingly, organizations that have collected large datasets oftentimes withhold use of these otherwise valuable and highly utilitarian data to avoid ethical or regulatory concerns with respect to leaks of sensitive data contained therein.

SUMMARY OF THE INVENTION

Systems and methods for fairness-enhanced utility-preserving data transformation for attribute suppression are disclosed. In one embodiment, a method may include: receiving, by a computer program, an original dataset comprising a plurality of samples of tabular data, each sample having a plurality of attributes; receiving, by the computer program, an identification of a utility attribute, a sensitive attribute, and a fairness attribute from the plurality of attributes; computing, by the computer program, entropy statistics for the original dataset using the utility attribute, the sensitive attribute, and the fairness attribute; training, by the computer program, auxiliary classifier models using the utility attribute, the sensitive attribute, and/or the fairness attribute; training, by the computer program, an auxiliary feature extractor model using the attributes other than the utility attribute; training, by the computer program, a transformation model with the auxiliary classifier models and the auxiliary feature extractor model; transforming, by the computer program, the original dataset into a transformed dataset using the transformation model; and training, by the computer program, a machine learning model using the transformed dataset, wherein the trained machine learning model maintains information associated with the utility attribute, maintains fairness with respect to the fairness attribute, and does not leak information about the sensitive attribute.

In one embodiment, the method may also include: receiving, by the computer program, an importance parameter for each of the utility attribute, the sensitive attribute, and the fairness attribute; deriving, by the computer program, theoretical bounds for the original dataset based on the entropy statistics, wherein the theoretical bounds are limits on possible values of the importance parameters; and validating, by the computer program, the importance parameters based on the theoretical bounds.

In one embodiment, the entropy statistics comprise an entropy for each utility attribute, an entropy for each sensitive attribute, an entropy for each fairness attribute, a conditional entropy for each combination of sensitive and utility attributes, a conditional entropy for each combination of fairness and utility attributes, and a joint entropy for each combination of fairness and utility attributes.

In one embodiment, the auxiliary classifier models provide an estimate of whether the transformed data produced by the transformation model complies with the utility attributes, sensitive attributes, and fairness attributes.

In one embodiment, the auxiliary feature extractor model is trained to output a multidimensional representation of the sensitive attributes and the fairness attributes. In one embodiment, the step of training the transformation model with the auxiliary classifier models and the auxiliary feature extractor model comprises: calculating, by the computer program, a loss between the transformed dataset and the original dataset; updating, by the computer program, the transformation model and the auxiliary feature extractor model with the loss; calculating, by the computer program, a corresponding cross-entropy losses for each auxiliary classifier model; and updating, by the computer program, the auxiliary classifier models with the corresponding cross-entropy losses.

In one embodiment, the step of training the transformation model with the auxiliary classifier models and the auxiliary feature extractor model is repeated for a predetermined number of iterations.

In one embodiment, the loss comprises a first loss term that encourages an amount of useful information in the transformed dataset, a second loss term that encourages an amount of sensitive information in the transformed dataset to be below a sensitive information threshold; a third loss term that encourages an amount of useful information to be above a useful information threshold and a fourth loss term that encourages a difference in predictions for utility attributes with fairness attributes of different values to be below a fairness threshold.

According to another embodiment, a non-transitory computer readable storage medium may include instructions stored thereon, which when read and executed by one or more computer processors, cause the one or more computer processors to perform steps comprising: receiving an original dataset comprising a plurality of samples of tabular data, each sample having a plurality of attributes; receiving an identification of a utility attribute, a sensitive attribute, and a fairness attribute from the plurality of attributes; computing entropy statistics for the original dataset using the utility attribute, the sensitive attribute, and the fairness attribute; training auxiliary classifier models using the utility attribute, the sensitive attribute, and/or the fairness attribute; training an auxiliary feature extractor model using the attributes other than the utility attribute; training a transformation model with the auxiliary classifier models and the auxiliary feature extractor model; transforming the original dataset into a transformed dataset using the transformation model; and training a machine learning model using the transformed dataset, wherein the trained machine learning model is accurate in predicting the utility attribute, fair with respect to the fairness attribute, and does not leak information about the sensitive attribute.

In one embodiment, the non-transitory computer readable storage medium may also include instructions stored thereon, which when read and executed by the one or more computer processors, cause the one or more computer processors to perform steps comprising: receiving an importance parameter for each of the utility attribute, the sensitive attribute, and the fairness attribute; deriving theoretical bounds for the original dataset based on the entropy statistics, wherein the theoretical bounds are limits on possible values of the importance parameters; and validating the importance parameters based on the theoretical bounds.

In one embodiment, the entropy statistics comprise an entropy for each utility attribute, an entropy for each sensitive attribute, an entropy for each fairness attribute, a conditional entropy for each combination of sensitive and utility attributes, a conditional entropy for each combination of fairness and utility attributes, and a joint entropy for each combination of fairness and utility attributes.

In one embodiment, the auxiliary classifier models provide an estimate of whether the transformed data produced by the transformation model complies with the utility attributes, sensitive attributes, and fairness attributes.

In one embodiment, the auxiliary feature extractor model is trained to output a multidimensional representation of the sensitive attributes and the fairness attributes.

In one embodiment, the step of training the transformation model with the auxiliary classifier models and the auxiliary feature extractor model may include instructions stored thereon, which when read and executed by the one or more computer processors, cause the one or more computer processors to perform steps comprising: calculating a loss between the transformed dataset and the original dataset; updating the transformation model and the auxiliary feature extractor model with the loss; calculating a corresponding cross-entropy losses for each auxiliary classifier model; and updating the auxiliary classifier models with the corresponding cross-entropy losses.

In one embodiment, the step of training the transformation model with the auxiliary classifier models and the auxiliary feature extractor model is repeated for a predetermined number of iterations.

In one embodiment, the loss comprises a first loss term that encourages an amount of useful information in the transformed dataset, a second loss term that encourages an amount of sensitive information in the transformed dataset to be below a sensitive information threshold; a third loss term that encourages an amount of useful information to be above a useful information threshold, and a fourth loss term that encourages a difference in predictions for utility attributes with fairness attributes of different values to be below a fairness threshold.

According to another embodiment, a system may include: an original dataset comprising original dataset comprising a plurality of samples of tabular data, each sample having a plurality of attributes; a user electronic device executing a user computer program; and an electronic device executing a computer program that is configured to receive the original dataset; to receive an identification of a utility attribute, a sensitive attribute, and a fairness attribute from the plurality of attributes from the user computer program; to compute entropy statistics for the original dataset using the utility attribute, the sensitive attribute, and the fairness attribute; to train auxiliary classifier models using the utility attribute, the sensitive attribute, and/or the fairness attribute, wherein the auxiliary classifier models provide an estimate of whether transformed data produced by the transformation model complies with the utility attributes, sensitive attributes, and fairness attributes; to train an auxiliary feature extractor model using the attributes other than the utility attribute; to train a transformation model with the auxiliary classifier models and the auxiliary feature extractor model; to transform the original dataset into a transformed dataset using the transformation model; and to train a machine learning model using the transformed dataset, wherein the trained machine learning model maintains information associated with the utility attribute, maintains fairness with respect to the fairness attribute, and does not leak information about the sensitive attribute.

In one embodiment, the computer program is further configured to receive an importance parameter for each of the utility attribute, the sensitive attribute, and the fairness attribute; to derive theoretical bounds for the original dataset based on the entropy statistics, wherein the theoretical bounds are limits on possible values of the importance parameters; and to validate the importance parameters based on the theoretical bounds.

In one embodiment, the entropy statistics comprise an entropy for each utility attribute, an entropy for each sensitive attribute, an entropy for each fairness attribute, a conditional entropy for each combination of sensitive and utility attributes, a conditional entropy for each combination of fairness and utility attributes, and a joint entropy for each combination of fairness and utility attributes.

In one embodiment, the computer program is configured to train the transformation model with the auxiliary classifier models and the auxiliary feature extractor model comprises by calculating a loss between the transformed dataset and the original dataset, wherein the loss comprises a first loss term that encourages an amount of useful information in the transformed dataset, a second loss term that encourages an amount of sensitive information in the transformed dataset to be below a sensitive information threshold; a third loss term that encourages an amount of useful information to be above a useful information threshold, and a fourth loss term that encourages a difference in predictions for utility attributes with fairness attributes of different values to be below a fairness threshold; updating the transformation model and the auxiliary feature extractor model with the loss; calculating a corresponding cross-entropy losses for each auxiliary classifier model; and updating the auxiliary classifier models with the corresponding cross-entropy losses; wherein the transformation model with the auxiliary classifier models and the auxiliary feature extractor model are trained for a predetermined number of iterations.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for fairness-enhanced utility-preserving data transformation for attribute suppression are disclosed.

In embodiments, transformed data may have low privacy risks and bias, but may still be used to facilitate the training of performant models. Embodiments may be flexible to satisfy various sets of constraints, allowing for utility, privacy and fairness limits on arbitrary attributes of data.

Embodiments may provide at least some of the following advantages. First, embodiments increase performance, such as with regard to the accuracy of predictions, the inference of sensitive attributes, and the output of discriminatory predictions with respect to demographics, leading to a better trade-off among privacy, fairness and utility. Next, embodiments may provide usability in that they may alleviate users' burden to evaluate different combinations of privacy and fairness methods. Next, embodiments may provide theoretical bounds and guarantees of downstream model performance on these dimensions, helping users better calibrate their expectations of their machine learning models before deployment.

Figure 1:
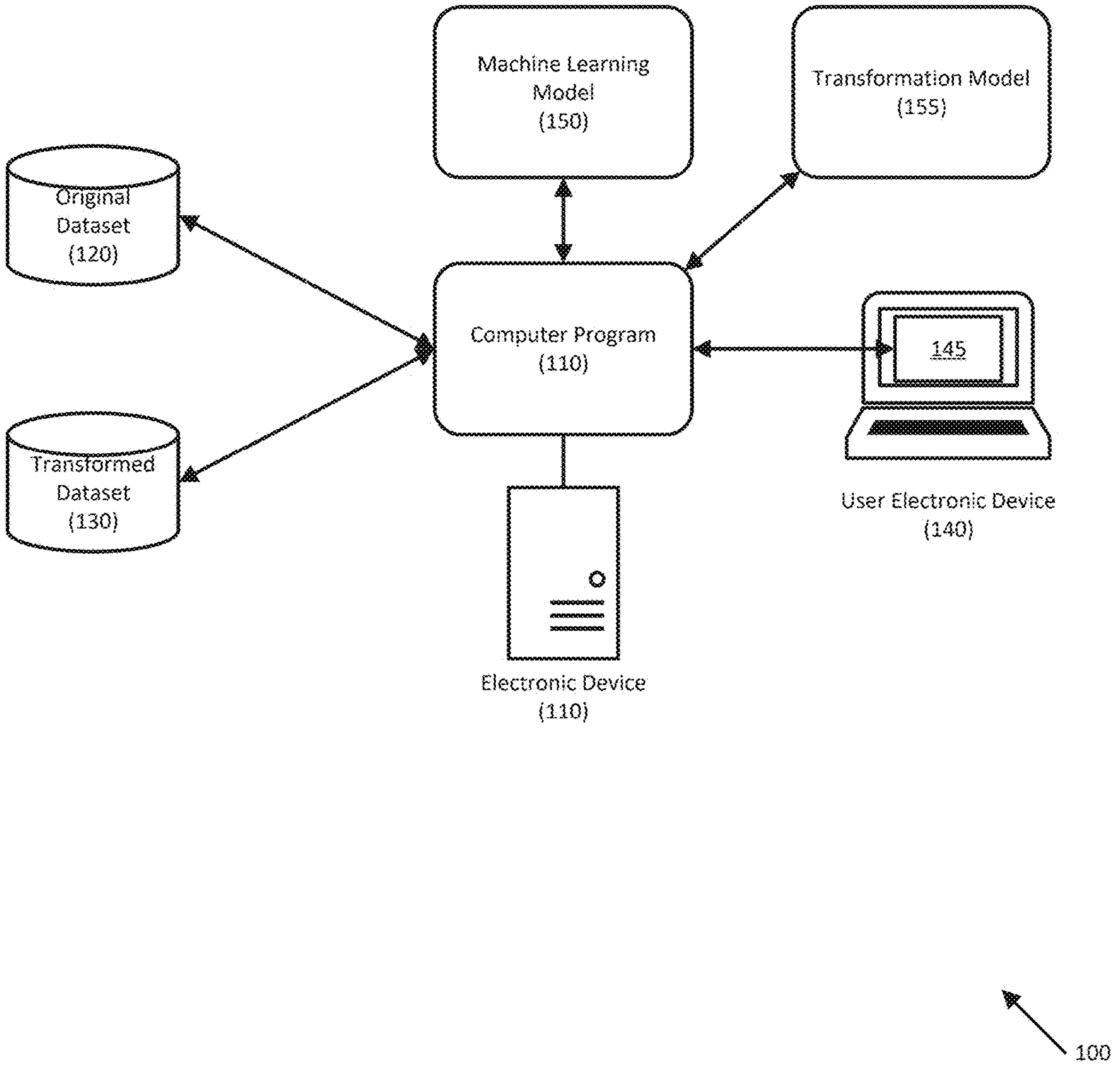
FIG. 1 depicts a system for fairness-enhanced utility-preserving data transformation for attribute suppression according to an embodiment.

Referring to FIG. 1, a system for fairness-enhanced utility-preserving data transformation for attribute suppression is disclosed according to an embodiment. System 100 may include electronic device 110, which may be a server (e.g., physical and/or cloud-based), a computer (e.g., workstation, desktop, laptop, notebook, tablet, etc.), a smart device (e.g., smart phone, smart watch, etc.), an Internet of Things (IoT) appliance, etc. Electronic device 110 may execute computer program 115 that may provide fairness-enhanced utility-preserving data transformation for attribute suppression.

System 100 may include original dataset 120 that may include any sort of data that may be used to train machine learning model 150. Original dataset 120 may include R samples (rows as in tabular data), each with C attributes (columns).

Computer program 115 may process original dataset 120 and may output transformed dataset 130, that may be used by machine learning model 150.

System 100 may further include user electronic device 140, such as a computer, a smart device, an IoT appliance, etc. User electronic device 140 may execute user computer program 145. User computer program 145 may interact with computer program 115, and may allow a user to provide parameters for transforming original dataset 120.

User computer program may train transformation model 155, which may receive original dataset 120 and transform it to transformed dataset 130 that complies with the user's selection of utility attributes, sensitive attributes, and fairness attributes.

Figure 2:
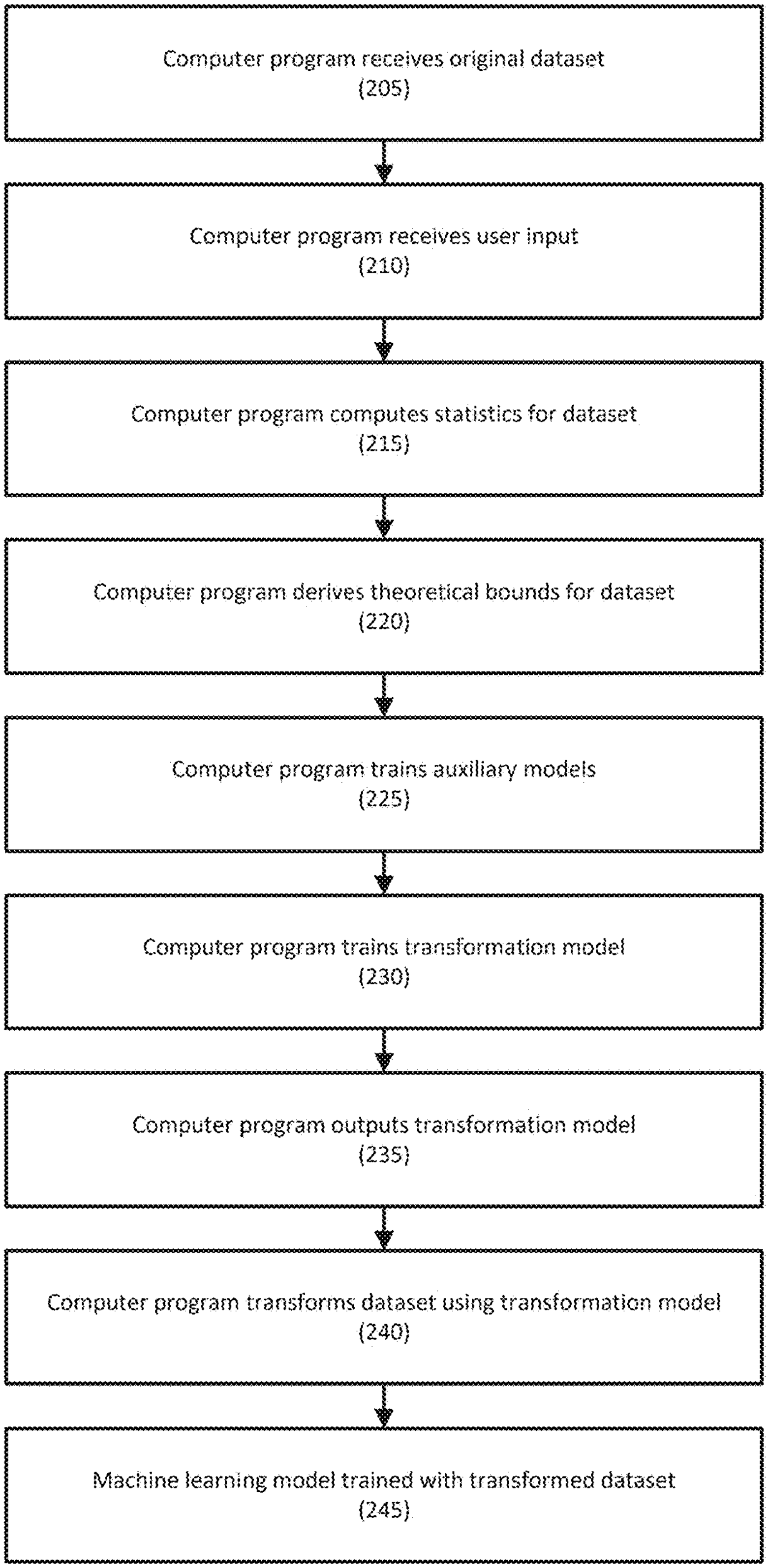
FIG. 2 depicts a method fairness-enhanced utility-preserving data transformation for attribute suppression according to an embodiment.

Referring to FIG. 2, a method for fairness-enhanced utility-preserving data transformation for attribute suppression is disclosed according to an embodiment.

In step 205, a computer program may receive an original dataset. The original dataset may include, for example, data that may be used to train a machine learning model. The data in the original dataset may have utility, but may also have privacy and fairness issues.

The original dataset may include R samples (e.g., rows of tabular data), each with C attributes (e.g., columns of tabular data).

In step 210, the computer program may receive a user input. For example, using a user electronic device, a user may provide selected utility attribute(s), privacy attribute(s), and fairness attribute(s), as well as associated importance parameters. For example, the user may identify one or more columns of the original dataset as including utility attributes, one or more columns of the original dataset as including privacy attributes, and one or more columns of the original dataset as including fairness attributes.

Utility attributes may be attributes that include information that has a particular utility for a downstream system, such as a value. Privacy attributes may be attributes that include information, such as personal identifiable information, that may be used to identify an individual. And fairness attributes may be attributes that unfairly bias a machine learning model towards a characteristic, such as age, sex, etc.

The user may also identify an importance parameter for each identified utility attribute, privacy attribute, and fairness attribute by assigning a numeric value. Any scheme of importance values may be used as is necessary and/or desired, such as 0 to 1, 0 to 10, etc. The importance parameters may identify the degree of importance of the attribute, such as a tightness of constraints with respect to the attributes.

For example, a user may specify one or multiple utility attributes $U_1, U_2, \ldots, U_N$ among the C possible attributes, and may provide, for each utility attribute, an importance parameter, $n_1, n_2, \ldots, n_N$, where Nis the number of utility attributes identified by the user.

The user may also specify zero or more sensitive attributes, $S_1, S_2, \ldots, S_M$ among the C possible attributes, and may provide, for each sensitive attribute, an importance parameter, $(m_1, m_2, \ldots, m_M)$, where M is the number of sensitive attributes identified by the user.

The user may also specify zero or more fairness attributes, $F_1, F_2, \ldots, F_K$) among the C possible attributes, and may provide, for each fairness attribute an importance parameter corresponding to each utility attribute, $o_{11}, o_{21}, \ldots, o_{K1}, o_{12}, o_{22}, \ldots, o_{K2}, \ldots, o_{1N}, o_{2N}, \ldots, o_{KN}$, where K is the number of fairness attributes identified by the user.

Note that sensitive and fairness attributes can overlap. For example, an attribute can be both a sensitive attribute and a fairness attribute. Utility attributes, however, cannot also be sensitive attributes or fairness attributes.

In step 215, the computer program may compute entropy statistics for the original dataset. For example, the computer program may calculate the following: the entropy for each utility attribute ($H(U_j)$), the entropy for each sensitive attribute ($H(S_i)$), the entropy for each fairness attribute ($H(F_k)$), the conditional entropy for each combination of sensitive and utility attributes ($H(U_j|S_i)$), the conditional entropy for each combination of fairness and utility attributes ($H(F_k|U_j)$), and the joint entropy for each combination of fairness and utility attributes ($H(F_k, U_j)$).

For example, the entropy, H, of an attribute C (i.e., S, F, or U) measures the level of unpredictability of its values, which is defined as the negative sum of the product of probability and log probability of all possible value c for an attribute C. This may be calculated as follows:

$$H(C) = -\sum_{c\in C} P(c)\cdot \log P(c)$$

For attributes C (i.e., U) and D (i.e., S and F) in dataset X, the entropy of C conditioned on D is defined as:

$$H(C \mid D) = -\sum_{d\in D} P(d)\sum_{c\in C} P(c \mid d)\cdot \log P(c \mid d)$$

The joint entropy may be calculated as follows:

$$H(C, D) = -\sum_{d\in D}\sum_{c\in C} P(c, d)\cdot \log P(c, d)$$

In step 220, the computer program may derive theoretical bounds for the original dataset. The theoretical bounds are limits on the possible values of the importance parameters given by the user. If the values do not comply with all the bounds stated here, then it is theoretically impossible to find a transformation that can satisfy the user-defined constraints.

For example, the computer program may validate all importance parameter values $m_i$, $n_j$, $o_{kj}$ provided by the user, and may ensure that none of the following constraints are violated: (a) $m_i \geq 0$; (b) $n_j \leq H(U_j)$; (c) $n_j \leq m_i + H(U_j|S_i)$; (d) $o_{k\,j} \leq H(U_j|F_k)$. If any of the constraints are not satisfied, the computer program may inform the user that changes to corresponding $m_i$, $n_j$, $o_{k\,j}$ values are needed.

In step 225, the computer program may train auxiliary classifier models. For example, the computer program may train auxiliary classifier models $\phi_i$ that parametrize a probability P ($S_i$|X), models $\psi_j$ that parametrize a probability P($U_j$|X), models $\rho_k$ that parametrize a probability P ($F_k$|X), and models $\sigma_{k\,j}$ that parametrize a probability P($U_j$, $F_k$|X). The auxiliary classifier models may be used in calculating loss terms, such as $\mathcal{L}_{s_i}$, below.

The auxiliary classifier models may provide an estimate of the transformed data X' produced by a transformation model θ, how useful X' is, and how well X' is at complying with the user-specified utility attributes, sensitive attributes, fairness attributes, and their respective importance parameters. The auxiliary classifier models are updated during training of the transformation model θ, but are initially trained on the original dataset X before the transformation model θ is trained so that they can provide more accurate estimates from the beginning. This expedites and enhances the training of the transformation model θ.

Taking auxiliary classifier model $\phi_1$ as an example, the computer program takes all attributes of a sample except attribute $S_1$ as input, and predicts attribute $U_1$ of the sample accordingly. Attributes that are not assigned to U, F, or S may also be included as model inputs. Auxiliary classifier model $\phi_1$ may be trained using gradient descent with standard cross-entropy loss.

Likewise, auxiliary classifier model $\psi_j$ may take all attributes other than $U_j$ to predict it; auxiliary classifier model $\rho_k$ may take all attributes other than $F_k$ to predict it; and auxiliary classifier model $\sigma_{kj}$ may take all attributes other than $U_j$ and $F_k$ to predict joint label ($U_j$, $F_k$).

Based on the values for M, N, and K above, there may be M φ models, N ψ models, K ρ models, and K times N models. There is one auxiliary feature extractor model η. Thus, in total, there are (1+M+N+K+NK) auxiliary models.

Auxiliary feature extractor model n may be an auxiliary model that takes all attributes other than utility attributes as an input, and outputs a multidimensional representation (in a multidimensional space, with specific number of dimensions). For example, the auxiliary feature extractor model n may transform a sample to its representation (a vector), such that those samples who are considered more similar by the task (e.g., those with same utility attributes) have more similar representations.

In step 230, the computer program may train the transformation model θ. In one embodiment, the training of the auxiliary models and the transformation model θ may be performed jointly.

Initially, the computer program may initialize the transformation model θ with random values.

In one embodiment, transformation model θ and auxiliary feature extractor model η may be iteratively trained. For example, the computer program may randomly split X into small batches, with each batch having b samples ($x_1$, $x_2$, . . . , $x_b$). Each batch of samples may be processed by applying transformation model θ to the current data batch ($x_1$, $x_2$, . . . , $x_b$) to get ($x'_1$, $x'_2$, . . . , $x'_b$). The computer program may then calculate the loss, $\mathcal{L}$, to update main models θ and auxiliary feature extractor model η. For example, the loss $\mathcal{L}$ may be calculated as follows:

$$\mathcal{L} = \sum_j \mathcal{L}_{x',j} + \sum_i \mathcal{L}_{S_i} + \sum_j \mathcal{L}_{U_j} + \sum_j\sum_k \mathcal{L}_{U_j,F_k}$$

Loss $\mathcal{L}$ is the aggregation of four different loss terms. The first loss term, $\mathcal{L}_{x',j}$, encourages the retention of useful information from the original samples in the transformed samples (not specific to utility attributes, fairness attributes, or sensitive attributes, but for all attributes), the second loss term, $\mathcal{L}_{s_i}$ encourages the information about sensitive attributes to be less than a certain threshold based on the importance parameter for the sensitive attributes, the third loss term $\mathcal{L}_{U_i}$ that encourages the information about utility attributes to be above a certain threshold based on the importance parameter for the utility attributes, and the fourth loss term, $\mathcal{L}_{U_j,F_k}$ the encourages a difference in predictions for utility attributes with fairness attributes of different values to be below a threshold based on the importance parameter for the fairness attribute.

For example, for a model performing loan approval, a utility attribute may be the decision of approve or not, and the fairness attribute may be ethnicity. The bias is the disparity of probability of approval between different races, when other circumstances are the same.

The loss term $\mathcal{L}_{x'j}$ is defined such that minimizing encourages retaining as much "usefulness" of X in X'. The objective for X' to contain enough useful information that, when a feature extractor maps X' into representations, the representations of samples of the same class (labels, or utility attributes) should be closer to each other, while being further away from samples of different classes. Auxiliary feature extractor model η acts as an approximation of this imaginary feature extractor.

The loss term $\mathcal{L}_{x',j}$ may be defined as follows:

$$\mathcal{L}_{X',j} = \frac{L_{F,j} + L_{F'j}}{2}$$

$$L_{F,j} = \frac{1}{b}\sum_{a=1}^{b}\left[\log\frac{\sum_{x_a^{\rho}\in pos(x_a)}\mathcal{F}(x_a, x_a^{p})}{\sum_{x_a^{p}\in pos(x_a)}\mathcal{F}(x_a, x_a^{\rho}) + \sum_{x_a^{n}\in neg(x_a)}\mathcal{F}(x_a, x_a^{n})}\right]$$

$$\mathcal{F}(x_a, \hat{x}) = e^{\cos(x_a, \eta(\dot{x}))/\tau}$$

The loss term $\mathcal{L}_{s_i}$ corresponds to the sensitive (privacy) attributes. When the user assigns an attribute as sensitive attribute, and provides an importance parameter for the sensitive attribute; this may indicate that the information contained in X' about S can be at most some given threshold. The loss term $\mathcal{L}_{s_i}$ is designed such that it penalizes the X' when the threshold is exceeded by minimizing the loss to reduce the information in X' about S.

The loss term $\mathcal{L}_{s_i}$ may be calculated as follows:

$$\mathcal{L}_{S_i} = d_{S_i}^2 + |d_{S_i}|$$

$$d_{S_i} = \min(\mathcal{L}_{CE}(S_i) + m_i - H(S_i), 0)$$

For loss term $\mathcal{L}_{U_j}$, the information contained in X' about U is to be higher than some threshold, and minimizing the loss encourages it to come back higher than the threshold.

For loss term $\mathcal{L}_{U_j}$ may be calculated as follows:

$$\mathcal{L}_{U_j} = d_{U_j}^2 + |d_{U_j}|$$

$$d_{U_j} = \max(\mathcal{L}_{CE}(U_j) + n_j - H(U_j), 0)$$

The bias in X' about F when predicting U should remain below some threshold. Minimizing loss term $\mathcal{L}_{U_j,F_k}$ encourages the bias to not exceed that threshold:

$$\mathcal{L}_{U_j,F_k} = d_{U_j,F_k}^2 + |d_{U_j,F_k}|$$

$$d_{U_j,F_k} = \min(\mathcal{L}_{CE}(U_j) + \mathcal{L}_{CE}(F_k) - \mathcal{L}_{CE}(U_j, F_k) - o_{kj} + n_j - H(U_j) - H(F_k) + H(U_j, F_k), 0)$$

The threshold may be based on the importance value for the fairness attribute.

The computer program may then calculate $(x'_1, x'_2, \ldots, x'_b)$ again with the latest transformation model θ and may then update all auxiliary classifier models $\phi_i$, $\psi_j$, $\beta_k$, $\sigma_{k\,j}$. Taking auxiliary classifier model $\phi_1$ as an example, the computer program may use the transformed data samples $(x'_1, x'_2, \ldots, x'_b)$, excluding attribute $U_1$, as an input to auxiliary classifier model $\phi_1$, and may calculate the cross-entropy loss with the outputs of auxiliary classifier model $\phi_1$ and attribute $U_1$ of original data samples $(x_1, x_2, \ldots, x_b)$ for one of the batches with b samples. It may then update auxiliary classifier model $\phi_1$ with this loss. All other auxiliary classifier models may be updated following this process, but with different attributes.

Step 230 may be run for a predetermined number of iterations, or "epochs." In each "epoch", the same step is performed on each batch of samples, and each step may be split into two stages-first, the loss, $\mathcal{L}$, may be calculated to update transformation model θ and the auxiliary feature extractor model η, and then the cross-entropy losses for each $\phi_i$, $\psi_j$, $\beta_k$, $\sigma_{kj}$ may be calculated, and the auxiliary classification models are updated.

In step 235, the computer program may output the transformation model.

In step 240, the computer program may transform the original dataset using the transformation model. The transformed dataset contains less information about the sensitive attributes, less bias with respect to the fairness attributes, and retains as much information about useful attributes as possible.

In step 245, a machine learning model may be trained with the transformed dataset. As a result of the training, the machine learning model is sufficiently accurate in predicting the utility attributes, fair with respect to fairness attributes, and does not leak information about sensitive attributes.

Figure 3:
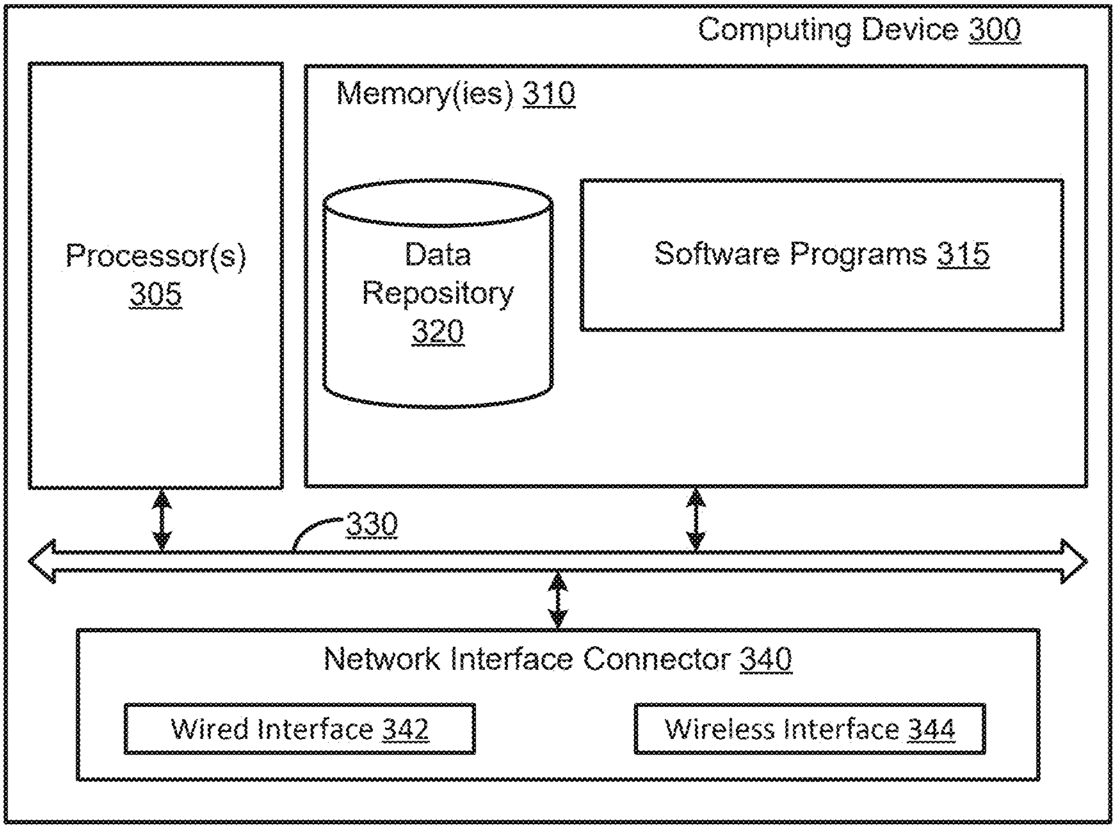
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method comprising:

receiving, by a computer program, an original dataset comprising a plurality of samples of tabular data, each sample having a plurality of attributes;

receiving, by the computer program, an identification of a utility attribute, a sensitive attribute, and a fairness attribute from the plurality of attributes;

computing, by the computer program, entropy statistics for the original dataset using the utility attribute, the sensitive attribute, and the fairness attribute;

training, by the computer program, auxiliary classifier models using the utility attribute, the sensitive attribute, and/or the fairness attribute;

training, by the computer program, an auxiliary feature extractor model using the attributes other than the utility attribute;

training, by the computer program, a transformation model with the auxiliary classifier models and the auxiliary feature extractor model;

transforming, by the computer program, the original dataset into a transformed dataset using the transformation model; and training, by the computer program, a machine learning model using the transformed dataset, wherein the trained machine learning model maintains information associated with the utility attribute, maintains fairness with respect to the fairness attribute, and does not leak information about the sensitive attribute.

2. The method of claim 1, further comprising:

receiving, by the computer program, an importance parameter for each of the utility attribute, the sensitive attribute, and the fairness attribute;

deriving, by the computer program, theoretical bounds for the original dataset based on the entropy statistics, wherein the theoretical bounds are limits on possible values of the importance parameters; and validating, by the computer program, the importance parameters based on the theoretical bounds.

3. The method of claim 1, wherein the entropy statistics comprise an entropy for each utility attribute, an entropy for each sensitive attribute, an entropy for each fairness attribute, a conditional entropy for each combination of sensitive and utility attributes, a conditional entropy for each combination of fairness and utility attributes, and a joint entropy for each combination of fairness and utility attributes.

4. The method of claim 1, wherein the auxiliary classifier models provide an estimate of whether the transformed data produced by the transformation model complies with the utility attributes, sensitive attributes, and fairness attributes.

5. The method of claim 1, wherein the auxiliary feature extractor model is trained to output a multidimensional representation of the sensitive attributes and the fairness attributes.

6. The method of claim 1, wherein the step of training the transformation model with the auxiliary classifier models and the auxiliary feature extractor model comprises:

calculating, by the computer program, a loss between the transformed dataset and the original dataset;

updating, by the computer program, the transformation model and the auxiliary feature extractor model with the loss;

calculating, by the computer program, a corresponding cross-entropy losses for each auxiliary classifier model; and updating, by the computer program, the auxiliary classifier models with the corresponding cross-entropy losses.

7. The method of claim 6, wherein the step of training the transformation model with the auxiliary classifier models and the auxiliary feature extractor model is repeated for a predetermined number of iterations.

8. The method of claim 6, wherein the loss comprises a first loss term that encourages an amount of useful information in the transformed dataset, a second loss term that encourages an amount of sensitive information in the transformed dataset to be below a sensitive information threshold; a third loss term that encourages an amount of useful information to be above a useful information threshold, and a fourth loss term that encourages a difference in predictions for utility attributes with fairness attributes of different values to be below a fairness threshold.

9. A non-transitory computer readable storage medium, including instructions stored thereon, which when read and executed by one or more computer processors, cause the one or more computer processors to perform steps comprising:

receiving an original dataset comprising a plurality of samples of tabular data, each sample having a plurality of attributes;

receiving an identification of a utility attribute, a sensitive attribute, and a fairness attribute from the plurality of attributes;

computing entropy statistics for the original dataset using the utility attribute, the sensitive attribute, and the fairness attribute;

training auxiliary classifier models using the utility attribute, the sensitive attribute, and/or the fairness attribute;

training an auxiliary feature extractor model using the attributes other than the utility attribute;

training a transformation model with the auxiliary classifier models and the auxiliary feature extractor model;

transforming the original dataset into a transformed dataset using the transformation model; and training a machine learning model using the transformed dataset, wherein the trained machine learning model is accurate in predicting the utility attribute, fair with respect to the fairness attribute, and does not leak information about the sensitive attribute.

10. The non-transitory computer readable storage medium of claim 9, further including instructions stored thereon, which when read and executed by the one or more computer processors, cause the one or more computer processors to perform steps comprising:

receiving an importance parameter for each of the utility attribute, the sensitive attribute, and the fairness attribute;

deriving theoretical bounds for the original dataset based on the entropy statistics, wherein the theoretical bounds are limits on possible values of the importance parameters; and validating the importance parameters based on the theoretical bounds.

11. The non-transitory computer readable storage medium of claim 9, wherein the entropy statistics comprise an entropy for each utility attribute, an entropy for each sensitive attribute, an entropy for each fairness attribute, a conditional entropy for each combination of sensitive and utility attributes, a conditional entropy for each combination of fairness and utility attributes, and a joint entropy for each combination of fairness and utility attributes.

12. The non-transitory computer readable storage medium of claim 9, wherein the auxiliary classifier models provide an estimate of whether the transformed data produced by the transformation model complies with the utility attributes, sensitive attributes, and fairness attributes.

13. The non-transitory computer readable storage medium of claim 9, wherein the auxiliary feature extractor model is trained to output a multidimensional representation of the sensitive attributes and the fairness attributes.

14. The non-transitory computer readable storage medium of claim 9, wherein the step of training the transformation model with the auxiliary classifier models and the auxiliary feature extractor model includes instructions stored thereon, which when read and executed by the one or more computer processors, cause the one or more computer processors to perform steps comprising:

calculating a loss between the transformed dataset and the original dataset;

updating the transformation model and the auxiliary feature extractor model with the loss;

calculating a corresponding cross-entropy losses for each auxiliary classifier model; and updating the auxiliary classifier models with the corresponding cross-entropy losses.

15. The non-transitory computer readable storage medium of claim 14, wherein the step of training the transformation model with the auxiliary classifier models and the auxiliary feature extractor model is repeated for a predetermined number of iterations.

16. The non-transitory computer readable storage medium of claim 14, wherein the loss comprises a first loss term that encourages an amount of useful information in the transformed dataset, a second loss term that encourages an amount of sensitive information in the transformed dataset to be below a sensitive information threshold; a third loss term that encourages an amount of useful information to be above a useful information threshold, and a fourth loss term that encourages a difference in predictions for utility attributes with fairness attributes of different values to be below a fairness threshold.

17. A system, comprising:

an original dataset comprising original dataset comprising a plurality of samples of tabular data, each sample having a plurality of attributes;

a user electronic device executing a user computer program; and an electronic device executing a computer program that is configured to receive the original dataset; to receive an identification of a utility attribute, a sensitive attribute, and a fairness attribute from the plurality of attributes from the user computer program; to compute entropy statistics for the original dataset using the utility attribute, the sensitive attribute, and the fairness attribute; to train auxiliary classifier models using the utility attribute, the sensitive attribute, and/or the fairness attribute, wherein the auxiliary classifier models provide an estimate of whether transformed data produced by the transformation model complies with the utility attributes, sensitive attributes, and fairness attributes; to train an auxiliary feature extractor model using the attributes other than the utility attribute, wherein the auxiliary feature extractor model is trained to output a multidimensional representation of the sensitive attributes and the fairness attributes; to train a transformation model with the auxiliary classifier models and the auxiliary feature extractor model; to transform the original dataset into a transformed dataset using the transformation model; and to train a machine learning model using the transformed dataset, wherein the trained machine learning model maintains information associated with the utility attribute, maintains fairness with respect to the fairness attribute, and does not leak information about the sensitive attribute.

18. The system of claim 17, wherein the computer program is further configured to receive an importance parameter for each of the utility attribute, the sensitive attribute, and the fairness attribute; to derive theoretical bounds for the original dataset based on the entropy statistics, wherein the theoretical bounds are limits on possible values of the importance parameters; and to validate the importance parameters based on the theoretical bounds.

19. The system of claim 17, wherein the entropy statistics comprise an entropy for each utility attribute, an entropy for each sensitive attribute, an entropy for each fairness attribute, a conditional entropy for each combination of sensitive and utility attributes, a conditional entropy for each combination of fairness and utility attributes, and a joint entropy for each combination of fairness and utility attributes.

20. The system of claim 17, wherein the computer program is configured to train the transformation model with the auxiliary classifier models and the auxiliary feature extractor model comprises by calculating a loss between the transformed dataset and the original dataset, wherein the loss comprises a first loss term that encourages an amount of useful information in the transformed dataset, a second loss term that encourages an amount of sensitive information in the transformed dataset to be below a sensitive information threshold; a third loss term that encourages an amount of useful information to be above a useful information threshold, and a fourth loss term that encourages a difference in predictions for utility attributes with fairness attributes of different values to be below a fairness threshold; updating the transformation model and the auxiliary feature extractor model with the loss; calculating a corresponding cross-entropy losses for each auxiliary classifier model; and updating the auxiliary classifier models with the corresponding cross-entropy losses; wherein the transformation model with the auxiliary classifier models and the auxiliary feature extractor model are trained for a predetermined number of iterations.

* * * * *